R. E. WALLISER

FRINGE TASSEL AND THE METHOD OF MAKING SAME

Nov. 17, 1931.

Original Filed Oct. 20, 1927

Re. 18,250

Witnesses:
C. E. Wiesels
F. C. Appleton

Inventor:
Robert E. Walliser,
By John R. H. Folk
his Attorney

Reissued Nov. 17, 1931 Re. 18,250

UNITED STATES PATENT OFFICE

ROBERT E. WALLISER, OF CHICAGO, ILLINOIS

FRINGE TASSEL AND THE METHOD OF MAKING SAME

Original No. 1,700,523, dated January 29, 1929, Serial No. 227,464, filed October 20, 1927. Application for reissue filed September 23, 1929. Serial No. 394,682.

My invention, in general, relates to fringe tassels and more particularly to fringe tassels of the type used in fringe heading material.

The object of my invention is to provide an improved fringe tassel of the kind indicated.

Another object of my invention is to provide an improved winding material for fringe tassels.

A further object of my invention is to eliminate the present comparatively slow hand method of fringe tassel manufacturing by the substitution of mechanical means and an improved method of fabrication, thereby effecting a great saving in time, labor and cost of production.

The fabrication and method, details of which will appear more fully in the hereinafter specification, when taken in connection with the accompanying drawings, yields especially important advantages when used in combination with the machine covered by a patent issued to me on a fringe tasseling machine, No. 1,663,534, dated March 20th, 1928.

In the drawings, Figure 1 is an elevational view of my fringe tassels attached to a fringe heading.

Figure 1:
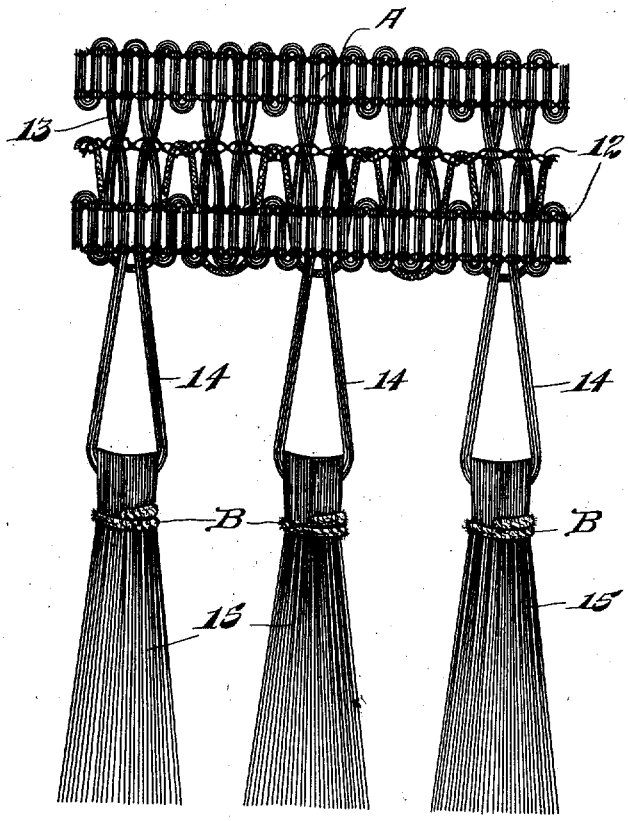

In the drawings, wherein, similar characters of reference indicate corresponding parts in the several views, A is a fringe heading, comprising the transverse stitching 12, and the threads 13, certain lengths of which depend to form the loops 14 through which warp rope is inserted, constituting, when wound with a winding B, the tassels 15.

Figure 3:
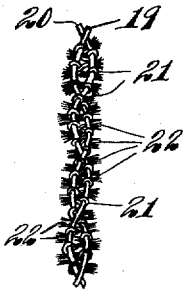
Figure 3 is an enlarged detail elevational view of a component part of my tassel winding.
Figure 2:
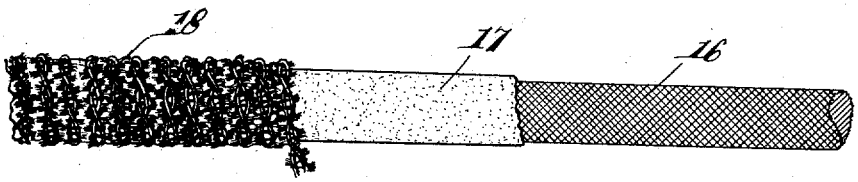
Figure 2 is an enlarged elevational view, with parts broken away, of my tassel winding.

In Figure 2 a detail construction of the tassel winding B is illustrated, wherein 16 is a roughened or knurled wire cord, 17 a shellac adhesive coating thereon, and 18 a chenille or a yarn type winding fibre, which, as shown in Figure 3, greatly enlarged, consists of intertwined fibres 19 and 20 about which the transversely wound fibres 21 are encircled,—furring or napping 22 of the fibres being produced in the manner customary in chenille production.

In the actual process of manufacture of the tassel winding B, by the herein method, the surface of the wire core 16 is roughened or knurled by machine rolling, and an adhesive covering 17, preferably shellac applied, after which the chenille winding 18 is wrapped. I have found that by roughening the surface of the wire core, together with the application of the adhesive 17, the chenille winding adheres more tenaciously than on a smooth unroughened wire. This is a point of practical advantage in my machine method of tassel manufacture wherein the desirability of a durable, bendable, but not excessively pliable, winding is especially advantageous. It is to be particularly noted in this respect that ordinary thread or cord is unsuitable as a winding in the machine production of tassels, by reason of its pliability since it has not sufficient stiffness to maintain any unsupported portion of its own length in a desired position to permit of its engagement by a machine for wrapping about sections of the warp rope to be formed into tassels.

The functioning of my fringe tasseling machine in the making of fringe tassels has been described in detail in my above-mentioned Patent No. 1,663,534, the general method only of machine production of fringe tassel being claimed in the present application.

In practice I have found that, with my machine, one operator will produce as many tassels as can be made by eight operators working by hand.

It is to be understood that the fabrication and method set forth is susceptible of some modification, and hence I do not wish to be understood as being limited to the precise details as set forth, but desire to avail myself of such variations as fairly fall within the scope of the appended claims.

What I claim as new and desire to secure by Letters Patent is:

1. A tassel binder comprising a roughened wire coated with an adhesive, and an outer finishing layer of lustrous fibre wound in contact with said wire through said adhesive, said wire being of sufficient stiffness to maintain itself in position when applied as a binder.

2. The method of making tassel binders consisting in roughening the surface of a wire core, applying an adhesive thereon, and finally wrapping a layer of fibrous material on said adhesive.

3. The method of making tassel binders consisting in roughening the surface of a wire core, coating said wire core with an adhesive, then wrapping a layer of fibrous material over said adhesive, whereby the adhesive and fibre is adapted to sink into the interstices of the roughened wire core in a manner to tenaciously adhere thereto.

4. A tassel binder comprising a roughened wire core coated with an adhesive; a layer of fibre over said adhesive, said fibre being wound in a manner to partially sink into the interstices of the roughened wire core, whereby a tenacious engagement of the fibre and the wire core is obtained, said wire being of sufficient stiffness to maintain itself in position when applied as a binder.

5. A tassel binder comprising a wire having a surface of sufficient roughness to cause an adhesive material to adhere thereto, said wire coated with an adhesive, and an outer finishing layer of fabric material wound upon said wire and maintained in position by said adhesive, said wire being of sufficient stiffness to maintain itself in position when wrapped as a binder around a section of tassel material.

In testimony whereof I have signed my name to this specification.

ROBERT E. WALLISER.